Nov. 29, 1927.                                        1,651,347
G. MOMBUR
SPEED INDICATING APPARATUS
Filed Oct. 27, 1927
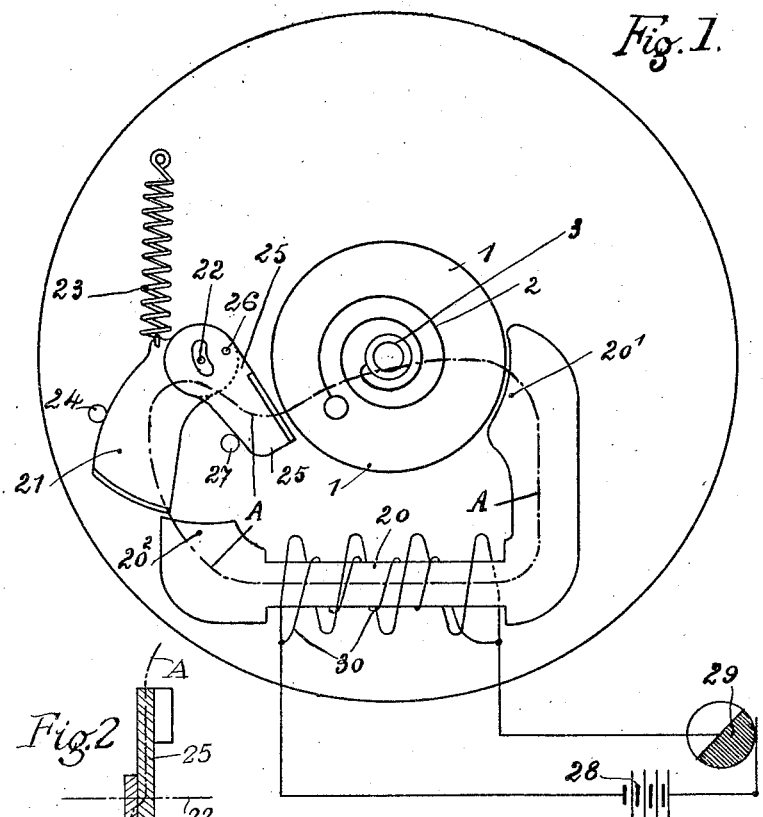
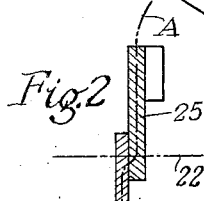
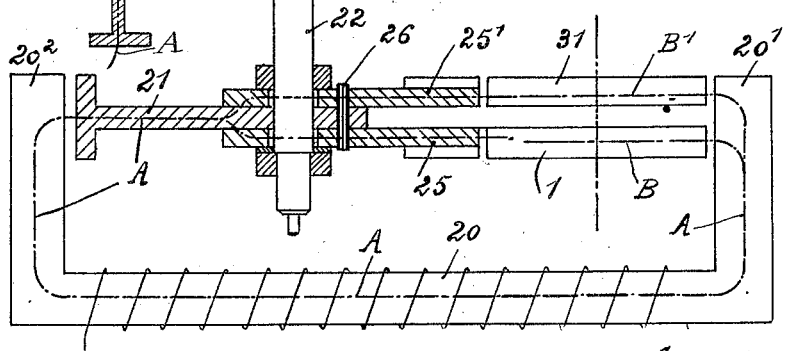
Inventor
Georges Mombur Patented Nov. 29, 1927.

1,651,347

UNITED STATES PATENT OFFICE.

GEORGES MOMBUR, OF VERSAILLES, FRANCE.

SPEED-INDICATING APPARATUS.

Application filed October 27, 1927, Serial No. 229,250, and in France March 27, 1926.

My invention relates to a speed indicating apparatus operated by the electric current from a battery designed more particularly to be applied to motor vehicles.

It has for its object the provision of such an apparatus in which a measuring system balanced by the action of a spiral spring, is acted upon by electric impulses having a constant value and a frequency which is proportional to the speed of the moving body, followed by backward movements produced by the spiral spring, the positive impulses being produced by a frictional action upon the wheel of said measuring system.

In the present apparatus the positive impulses are produced by a magnetic device in combination with an electromagnet of which the circuit is closed at a frequency that is proportional to the speed of the moving body.

The appended drawing shows by way of example a mode of execution of the mechanism of a speed indicator according to the present invention.

Fig. 1 is a front diagrammatic elevation of said mechanism.

Fig. 2 is a detail showing a section through the armature and polar element.

Fig. 3 is a diagrammatic view of a modified form of the invention.

In the form of the invention shown in Fig. 1, the measuring wheel or element 1 is balanced by the spiral spring 2 which tends to retain it in the position corresponding to the zero speed and such wheel or element is made of a magnetic metal, such as very soft iron for instance. The spring 2 is connected on one part to the wheel 1 and on the other part to the axle 3 which is connected to the index (not shown) in a known manner. The wheel 1 is included in the magnetic circuit of an electromagnet 20 of which one of the poles 20¹ is opposite said wheel. An armature 21 may move in front of the other pole 20² of the electromagnet. It is articulated at 22 and drawn back by a spring 23 in contact with an abutment 24 and it carries a polar element 25 drawn along by the eccentric lug or projection 26, which can be made to engage the measuring wheel 1 or abut against an abutment 27. The magnetic circuit of the electromagnet is completed as shown by the dash and dot line A as will be seen in Fig. 1.

The diagram shown in the sectional view Fig. 2 shows that the parts 25 and 21 are superimposed and thus present a large surface to the magnetic flux passing along line A. It will therefore be evident that at the moment of magnetization a strong adhering pressure will be created between these parts.

The electromagnet is fed by the current from a battery of accumulators 28 interrupted and closed with a great frequency by means of a breaking device 29 rotating at a speed which is a function of that of the moving body.

The operation of the device is as follows:

When the current flows through the electromagnet the polar element 25 engages first the measuring wheel or element 1 thus establishing the mechanical connection and at the same time pressure due to magnetization is made to act between the element 25 and the armature 21 which being set in motion and rotating at 22 gets nearer to the pole 20² and presses more strongly the element 25 against the wheel 1. On the other hand, the lug or projection 26, which is made integral with the armature 21, being moved, draws along the polar element 25 and consequently the measuring wheel a distance which is proportionate to the movement of the armature between the abutments 24 and 27.

This arrangement has the great advantage of producing simultaneously an advance movement and a progressive braking effect on the armature as the magnetic circuit is more completely closed or shortened. The friction or clutching effect between the overlapping portions of the armature 21 and the polar element 25 due to their mutual attraction increases with the progressive shortening of the magnetic circuit because of the increase in magnetic flux due to such shortening of the circuit. Since the polar element during this cycle of operation is in contact with the wheel 1 and cannot therefore rotate counter-clockwise, it follows that the counter-clockwise rotation of the armature which is magnetically clutched thereto will also be resisted. Oscillations of the armature at the end of its movement towards the pole piece 20² are thus avoided because of the damping action due to the increasing frictional resistance. On the other hand the armature at the beginning of its swing toward the pole piece 20² is practically free. While the effect upon the armature depends on the value of the current the movement or stroke of the armature is always the same.

When the flow of the current is interrupted, the armature 21 is drawn back by the action of spring 23 and the magnetization being also interrupted, the pressure on the measuring wheel 1 is relieved. A slight remanence is still apparent between the element 25 and the armature, so that the return movement of the latter assists in disengaging the polar element 25 from the wheel 1 and consequently immediately frees the latter. The lug or projection 26 draws back the polar element 25 to the starting posion where it will remain on the abutment 27 until the current is closed again.

On these operations being repeated a series of positive displacements and of disengagements of the measuring wheel take place which give the indication of the speed according to the manner already known in apparatus of this kind.

In order to accelerate the demagnetization there will be advantageously provided a secondary winding 30 shunted and mounted on the electromagnet core and having a small coefficient of self induction but a resistance which is preferably higher than that of the primary winding. At the breaking of the circuit the breaking current flows in the reverse direction in the winding 30 and creates a demagnetizing current.

When integrating apparatus for the distance covered are coupled with the indicating apparatus the forward movement of these apparatus may be obtained exactly in the manner above described for the forward displacement of the measuring wheel.

Fig. 3 of the annexed drawings is a diagram of this arrangement.

Upon a spindle preferably in line with that of the measuring wheel but not connected with it is keyed a second wheel 31 of magnetic metal which constitutes the first wheel of the integrating mechanism. A second polar mass element $25^1$ is placed on the other face of the armature 21 rotating on the spindle 22. The polar elements 25 and $25^1$ are traversed and operated by an eccentric lug or projection 26.

It will be evident that in operation two magnetic circuits will be established as indicated at A B and A $B^1$ and that the operations above described will now take place on both wheels.

Consequently a feeding motion of the measuring wheel and of the driving wheel of the integrating device will take place.

Having now described my invention I declare that what I claim and desire to secure by Letters Patent of the United States is:

1. A motor for speed indicating apparatus comprising a rotatable element, an electro-magnet, one pole of the electro-magnet being disposed adjacent said rotatable element, an armature adapted to be attracted by the second pole of said electro-magnet when the same is energized, a spring for restoring the armature to its initial position when the electro-magnet is de-energized, and a magnetizable pawl oscillated by said armature and adapted to advance and then release said rotatable element, the pawl cooperating with the armature and the rotatable element to complete a magnetic circuit for the flux of said electro-magnet.

2. The motor according to claim 1 further characterized in that said armature is pivoted to swing toward the said second pole of the electro-magnet when the latter is energized, and abutments to limit the swing of said armature in either direction.

3. The motor according to claim 1 further characterized in that the said armature is pivotally mounted, the said pawl being pivoted to said armature eccentrically with respect to the pivotal axis thereof.

4. The motor according to claim 1 further characterized in that the said armature is pivotally mounted, the said pawl being pivoted to said armature eccentrically with respect to the pivotal axis thereof, the said armature and pawl also being held in frictional contact by their mutual attraction when magnetized, whereby angular movements of the armature are transmitted to the pawl.

5. A motor for speed indicating apparatus comprising a rotatable wheel, an electro-magnet, one pole of the electro-magnet being disposed adjacent said wheel, and magnetizable driving means actuated by said electro-magnet and adapted to advance the said wheel, said driving means being interposed between the second pole of the electro-magnet and the said wheel whereby a magnetic circuit is provided, said circuit including the said magnetizable driving means, the wheel, and the electro-magnet.

6. A motor for speed indicating apparatus comprising a rotatable wheel, an electro-magnet, one pole of said electro-magnet tranmitting flux directly to said wheel, a pivoted armature near the other pole of said electro-magnet, an abutment limiting the movement of said armature, a return spring tending in opposition to the attraction of said electro-magnet to move said armature towards said abutment, a pawl actuated by the movement of said armature, said pawl being magnetically drawn into contact with the wheel by flux which passes through the armature and the wheel when the electro-magnet is energized.

7. The motor according to claim 6 further characterized in that a second abutment is provided to limit the movement of said pawl away from the wheel.

8. A motor for speed indicating apparatus comprising a wheel, an electro-magnet, a pivoted armature drawn toward a pole of said electro-magnet when the same is energized, a spring for restoring the armature to its initial position when the electro-magnet is de-energized, a pawl adapted to advance said wheel, said pawl being pivoted to said armature eccentrically with respect to the pivotal axis of the latter, and said pawl being adapted to frictionally engage said armature under the force of magnetic attraction set up by the magnetization of said electro-magnet whereby through said frictional engagement the angular movements of the armature will be transmitted to the pawl.

In witness whereof, I have hereunto signed my name.

GEORGES MOMBUR.